(12) United States Patent
Kim et al.

(10) Patent No.: US 11,976,666 B2
(45) Date of Patent: May 7, 2024

(54) FAN MOTOR

(71) Applicant: LG Electronics Inc., Seoul (KR)

(72) Inventors: Sunggi Kim, Seoul (KR); Byungjik Kim, Seoul (KR); Eunji Hwang, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 17/217,580

(22) Filed: Mar. 30, 2021

(65) Prior Publication Data
US 2022/0128062 A1    Apr. 28, 2022

(30) Foreign Application Priority Data
Oct. 22, 2020   (KR) .......................... 10-2020-0137694

(51) Int. Cl.
| F04D 29/26 | (2006.01) |
| F04D 25/06 | (2006.01) |
| F04D 25/08 | (2006.01) |
| F04D 29/053 | (2006.01) |
| F04D 29/056 | (2006.01) |
| F04D 29/32 | (2006.01) |

(52) U.S. Cl.
CPC ....... F04D 29/263 (2013.01); F04D 25/0606 (2013.01); F04D 25/082 (2013.01); F04D 29/053 (2013.01); F04D 29/056 (2013.01); F04D 29/325 (2013.01)

(58) Field of Classification Search
CPC .. F04D 29/263; F04D 39/325; F04D 29/4226; F04D 29/541
See application file for complete search history.

(56) References Cited

U.S. PATENT DOCUMENTS

| 11,085,454 | B2 * | 8/2021 | Lee | ...................... F04D 29/403 |
| 2016/0037984 | A1 | 2/2016 | Park et al. | |
| 2018/0363679 | A1 * | 12/2018 | Johnson | ................. H02K 5/207 |
| 2019/0365167 | A1 * | 12/2019 | Jung | ....................... H02K 7/14 |

(Continued)

FOREIGN PATENT DOCUMENTS

| CN | 103066753 | 4/2013 |
| CN | 107920704 | 4/2018 |
| CN | 109104060 | 12/2018 |

(Continued)

OTHER PUBLICATIONS

Office Action in Australian Appln. No. 2020289847, dated Nov. 5, 2021, 8 pages.

(Continued)

Primary Examiner — Sabbir Hasan
(74) Attorney, Agent, or Firm — Fish & Richardson P.C.

(57) ABSTRACT

A fan motor includes: a housing, a rotation shaft oriented across an inner center of the housing, an impeller located at a first side of the rotation shaft, a rotor connected to the rotation shaft and spaced apart from the impeller in an axial direction, a stator that surrounds the rotor, a first bearing located at a first end of the rotation shaft, a second bearing that is located at a second end of the rotation shaft and that is configured to rotatably support the rotation shaft, and a first bearing housing that accommodates and supports the first bearing, that is fixed inside the housing, and that is configured to guide a flow of air introduced into the housing.

21 Claims, 7 Drawing Sheets

(56) References Cited

U.S. PATENT DOCUMENTS

2020/0059133 A1     2/2020   Okubo et al.

FOREIGN PATENT DOCUMENTS

| | | |
|---|---|---|
| CN | 211398054 | 9/2020 |
| EP | 1025792 | 10/2006 |
| EP | 3343043 | 7/2018 |
| EP | 3376043 | 9/2018 |
| EP | 3604759 | 2/2020 |
| GB | 2573813 | 11/2019 |
| JP | S49149907 U | 12/1974 |
| JP | 2007506053 | 3/2007 |
| JP | 2012-255412 | 12/2012 |
| JP | 102141610 | 8/2020 |
| JP | 2020141557 | 9/2020 |
| JP | 2020143589 | 9/2020 |
| TW | 201906287 | 2/2019 |
| WO | WO2019194637 | 10/2019 |
| WO | WO2019220071 | 11/2019 |

OTHER PUBLICATIONS

Notice of Allowance in European Appln. No. 21165047.8, dated Jan. 26, 2023, 9 pages.
Office Action in Taiwanese Appln. No. 109144327, dated Oct. 20, 2021, 13 pages (with English translation).
Extended European Search Report in European Appln. No. 21165047.8, dated Sep. 2, 2021, 60 pages.

\* cited by examiner

FAN MOTOR

CROSS-REFERENCE TO RELATED APPLICATION

Pursuant to 35 U.S.C. § 119(a), this application claims the benefit of the earlier filing date and the right of priority to Korean Patent Application No. 10-2020-0137694, filed on Oct. 22, 2020, the contents of which is incorporated by reference herein in its entirety.

TECHNICAL FIELD

The present disclosure relates to a fan motor capable of rotating a fan at high speed.

BACKGROUND

A motor refers to a device that generates rotational force by using electric energy. In general, a motor includes a housing, a stator disposed inside the housing, a rotor disposed inside the stator to be rotated by a magnetic field generated from the stator, and a rotation shaft coupled to the rotor and rotating together with the rotor.

A fan, such as an impeller, may be coupled to one side of the rotation shaft of the motor to generate air current.

The motor may be installed in a home appliance such as a vacuum cleaner or a hair dryer, and the motor is coupled to a fan. The fan is rotated by receiving power from an electric motor to generate air current.

In general, since a vacuum cleaner or a hair dryer is operated with being held by a user by hand, size and weight thereof need to be reduced to increase user's portability and convenience. In addition, since high-speed rotation is essential in a vacuum cleaner or a hair dryer, cooling according to the high-speed rotation of the motor and securing of reliability of a bearing are needed.

In the Japanese Patent Publication No. 2007-506053A (hereinafter referred to as Patent Document 1), air generated by a rotation of an impeller flows toward a motor, which is disadvantageous to cooling of the motor and makes it difficult to secure a performance of the motor during high-speed rotation.

In addition, the Japanese Patent Publication No. 2020-141557A (hereinafter referred to as Patent Document 2) discloses a structure in which air is introduced to cool a motor, then flows by an impeller. However, a bearing is disposed between the impeller and the motor to support the impeller in a form of a cantilever, thereby resulting in a stability problem in high-speed rotation and deteriorating a reliability of the bearing due to a concentration of load on the bearing.

Therefore, research on a structure of a fan motor capable of preventing a deterioration of a flow of air generated between an impeller and a bearing housing, while ensuring a stability of a bearing during high-speed rotation along with miniaturization and weight reduction of the fan motor is needed.

SUMMARY

An aspect of the present disclosure is to provide a structure of a fan motor capable of preventing a phenomenon of interfering with a flow of air when rotating at high speed of 100,000 rpm or above, and capable of implementing miniaturization and weight reduction.

Another aspect of the present disclosure is to propose a structure of a fan motor in which bearings each installed at each end of a rotation shaft is stably supported by a bearing housing to ensure a reliability.

Another aspect of the present disclosure is to propose a structure of a fan motor capable of enabling more efficient cooling while air introduced from outside is brought into contact with a stator and a rotor by changing a movement path of the air introduced from outside in accordance with high-speed rotation.

A fan motor for solving the above-described problems includes a first bearing housing that integrally serves as a vane and a bearing housing to perform a role as a bearing housing capable of implementing a bearing support structure. In addition, a plurality of plates guides a flow of air to reduce a loss of air flow compared with a case in which a bearing housing supporting a bearing is separately installed.

Specifically, the fan motor according to this embodiment may include a housing, a rotation shaft rotatably installed across an inner center of the housing, an impeller rotatably installed at one side of the rotation shaft, a rotor installed on the rotation shaft to be spaced apart from the impeller in an axial direction, a stator installed to surround the rotor with an air gap with the rotor in an inner side of the housing, a first bearing installed at one end of the rotation shaft, a second bearing installed at another end of the rotation shaft to rotatably support the rotation shaft, and a first bearing housing accommodating and supporting the first bearing, fixedly installed inside the housing, and guiding a flow of air introduced into the housing.

In the fan motor according to an embodiment, as air introduced by an operation of the impeller moves to the first bearing housing while being brought into contact with the stator and the rotor, the air introduced by the operation of the impeller can cool the motor first and thereby securing an effective cooling performance.

Here, the first bearing housing may include an outer body formed in a cylindrical shape, an inner body formed in a cylindrical shape and disposed inside the outer body, and a plurality of plates extending to connect between an outer side surface of the inner body and an inner side surface of the outer body. Accordingly, the first bearing housing can stably support the first bearing while being fixed to the housing, and guide a movement of air introduced by the impeller.

In addition, each of the plates may guide a flow of air passed through the impeller to move outside, and the plurality of plates may be radially disposed obliquely by a predetermined angle so that the air introduced moves toward the impeller. Accordingly, the air introduced by the impeller can be smoothly discharged from the housing.

In addition, as another embodiment, the plates may be disposed at predetermined intervals along the outer side surface of the inner body.

In the fan motor according to an embodiment, an upper surface of the inner body may be provided with a vane mounting portion formed in a flat shape with a predetermined area to stably support a vane mounted thereon.

In addition, a lower surface of the inner body may be provided with a bearing supporting portion protruding downwardly so that the first bearing is mounted thereon. Accordingly, a role of the bearing housing capable of stably supporting the bearing is performed.

Specifically, the bearing supporting portion may be formed in a circular ring shape to protrude downwardly, and the first bearing may be disposed in an accommodating space provided inside the bearing supporting portion.

The fan motor according to an embodiment may include a second bearing housing coupled to a lower portion of the housing, disposed at an upstream side of the stator with respect to a flow direction of the air, and provided with a bearing accommodating portion formed to be recessed at a central portion thereof to accommodate the second bearing. In addition, the second bearing housing may be provided with a plurality of air inlet holes formed at positions adjacent to the bearing accommodating portion to allow air intake. And, air can be introduced from outside through the plurality of air inlet holes of the second bearing housing.

In addition, the second bearing housing may include an outer ring portion formed in a cylindrical shape with a predetermined height at an outer edge of the second bearing housing, and a connection portion extending to connect between the bearing accommodating portion and the outer ring portion.

Here, each of the air inlet holes may be formed through the connection portion and be provided between the outer ring portion and the connection portion.

The fan motor according to an embodiment may include a vane disposed on the first bearing housing in an up-down direction to guide a flow of air moving from the first bearing housing.

Here, the vane may be provided with a plurality of vane blades along an outer side surface of a cylindrical vane hub, and each of the vane blades may be disposed in a shape corresponding to a plurality of plates formed in the bearing housing.

In addition, the impeller may be provided with a plurality of blades protruding along an outer circumferential surface of a cylindrical hub to form a flow of air.

In the fan motor according to an embodiment, the first bearing may be implemented as an O-ring, and the second bearing may be implemented as a ball bearing.

In addition, both of the first bearing and the second bearing may be implemented as either a ball bearing or an O-ring. Further, the first bearing may be implemented as a ball bearing, and the second bearing may be implemented as an O-ring.

In the fan motor according to an embodiment, the impeller, the rotor and the stator may be disposed between the first bearing and the second bearing respectively installed at each end of the rotation shaft. And accordingly, air introduced by the impeller can cool the motor first, and more stable support can be achieved even when a distance between the first bearing and the second bearing is relatively long.

In the fan motor according to an embodiment, as the first bearing housing is installed at a downstream side of the impeller with respect to a flow of air generated by the impeller, a stable support can be achieved even when a distance between the first bearing and the second bearing is relatively longer than that of the related art disclosure.

That is, the fan motor has a structure in which the first bearing, the impeller, the rotor and the stator, and the second bearing are sequentially installed on the rotation shaft, in particular, the impeller, the rotor and the stator are installed between the first bearing and the second bearing. Therefore, both ends of the rotation shaft can be more effectively supported to implement a more stable structure in the fan motor rotating at high speed.

In the fan motor according to an embodiment, as the air introduced into the housing passes through the second bearing housing, and the rotor and the stator, and then passes through the impeller and the first bearing housing to be discharged outside, the rotor and the stator can be cooled by air at a relatively low temperature.

In the fan motor having the above structure, changes in an air flow path are minimized by a bearing housing installed adjacent to an impeller and a plurality of plates formed in the bearing housing to improve a flow efficiency.

Specifically, since the air introduced by the impeller is moved in a state in which changes in the air flow path are minimized by the plurality of plates formed in the first bearing housing, there is no interference in the flow of air due to the flow path, and therefore, a fan efficiency is prevented from being reduced.

In addition, since bearings each installed at each end of the rotation shaft has a structure in which one bearing is accommodated in a bearing housing and another bearing is accommodated in a sub-bearing housing to allow more stable support even in a rotation at high speed of 100,000 rpm or above, a lifespan of the bearing can be extended.

Specifically, since a first bearing is supported by a first bearing housing and a second bearing is supported by a second bearing housing, more stable support can be achieved during the high-speed rotation of the motor even when the first bearing and the second bearing supporting each end of the rotation shaft are arranged far from each other according to a motor design.

Further, since the air introduced by the rotation of the impeller is brought into contact with the stator and the rotor first even when the fan motor rotates at high speed of 100,000 rpm or above, more efficient cooling can be achieved.

Specifically, as the air introduced by the impeller is brought into contact with the stator and the rotor after passing through the second bearing, and thereby allowing the motor to be brought into contact with air at relatively low temperature compared with the related art structure in which the motor is cooled by air that has already been brought into contact with the impeller, a cooling performance can be improved.

DETAILED DESCRIPTION

Hereinafter, a fan motor according to the present disclosure will be described in detail with reference to the accompanying drawings.

For the sake of brief description with reference to the drawings, the same or equivalent components may be provided with the same or similar reference numbers, and description thereof will not be repeated.

Furthermore, a structure applied to any one embodiment may be also applied in the same manner to another embodiment if they do not structurally or functionally contradict each other even in different embodiments.

A singular representation may include a plural representation unless it represents a definitely different meaning from the context.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
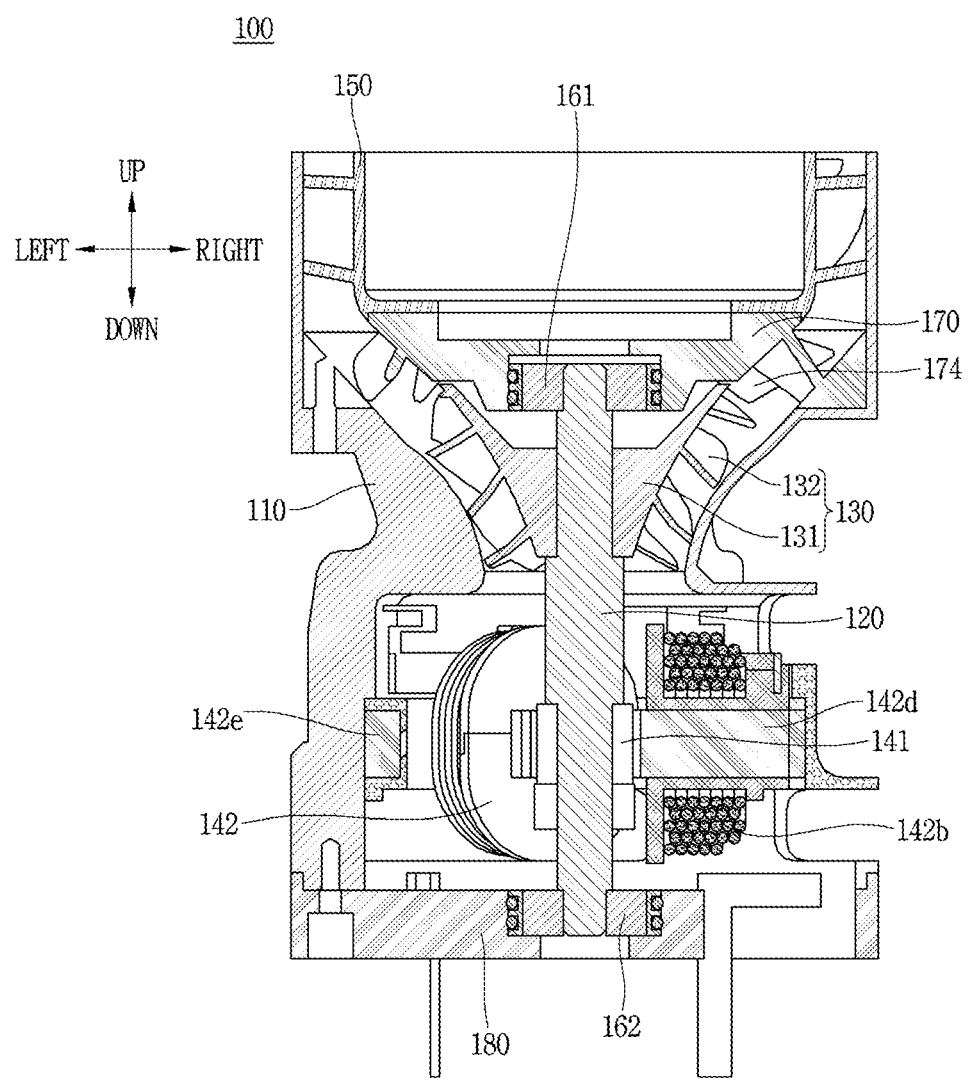
FIG. 1 is a longitudinal sectional view illustrating a fan motor according to the present disclosure.
Figure 2:
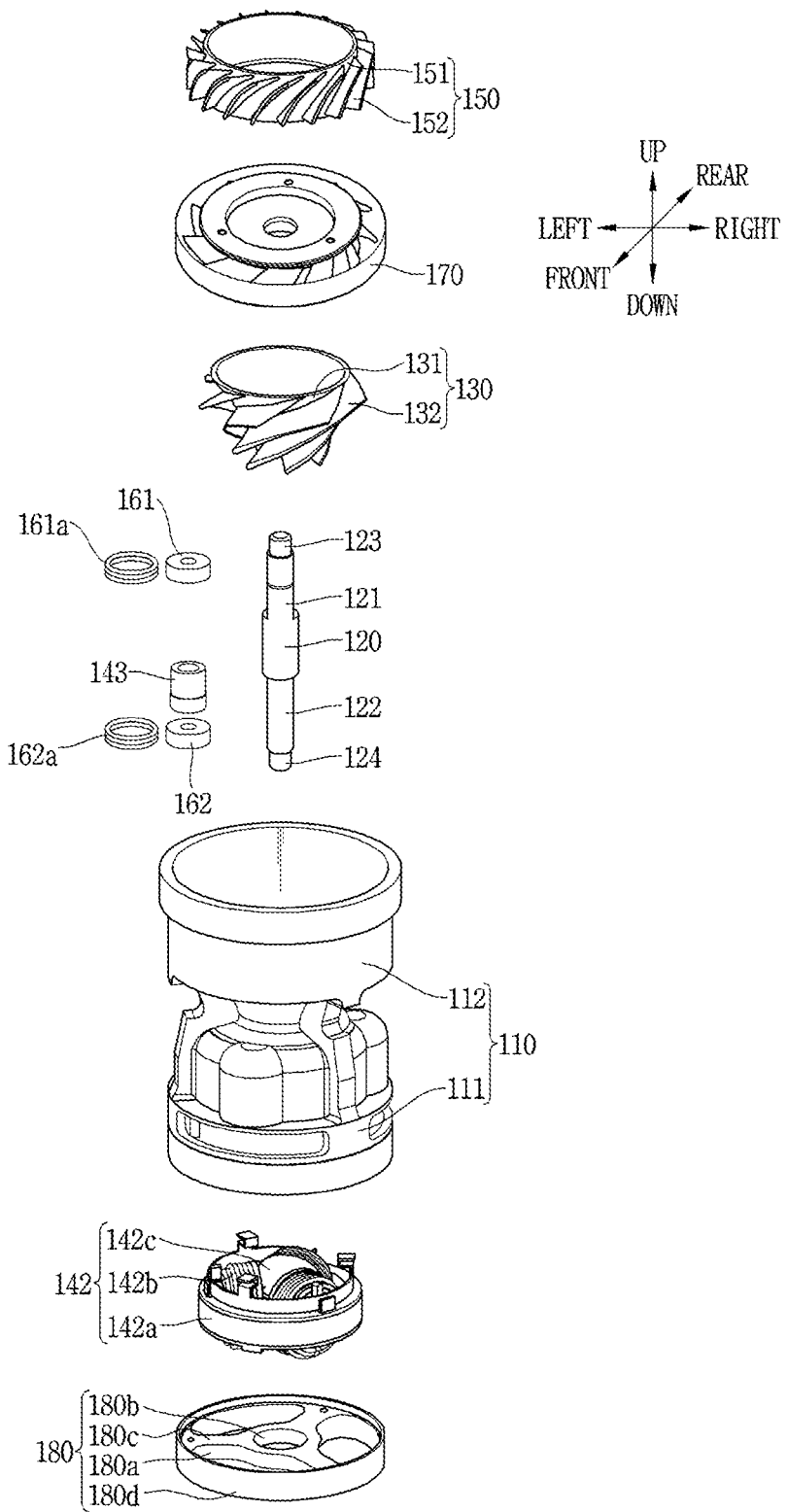
FIG. 2 is an exploded perspective view illustrating a fan motor according to the present disclosure.
Figure 3:
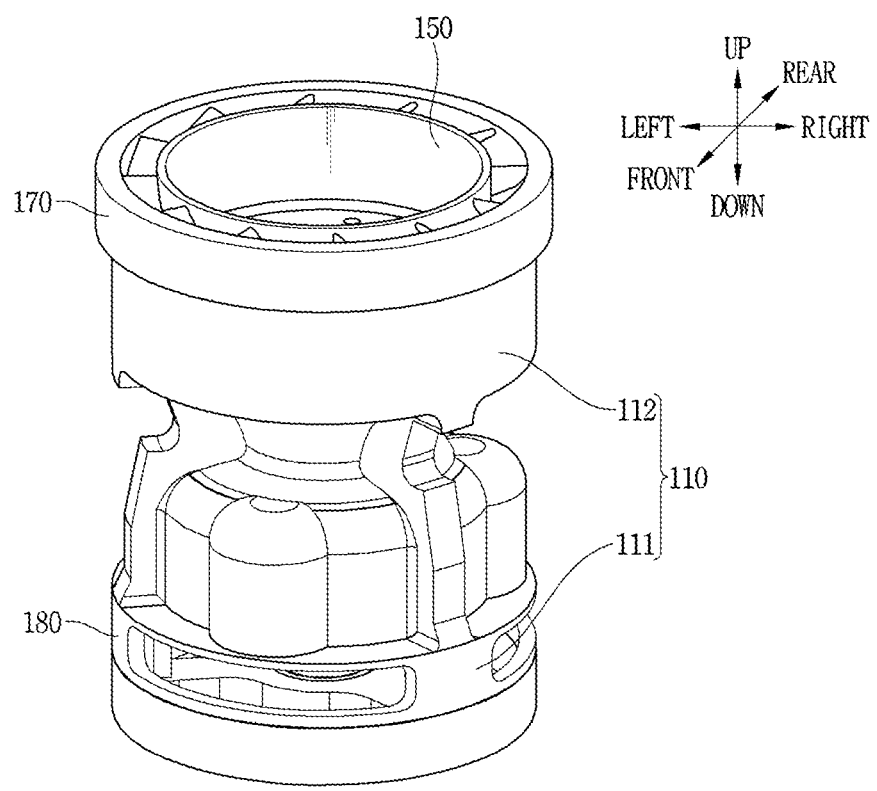
FIG. 3 is a conceptual view illustrating an exterior appearance of a fan motor.
Figure 4:
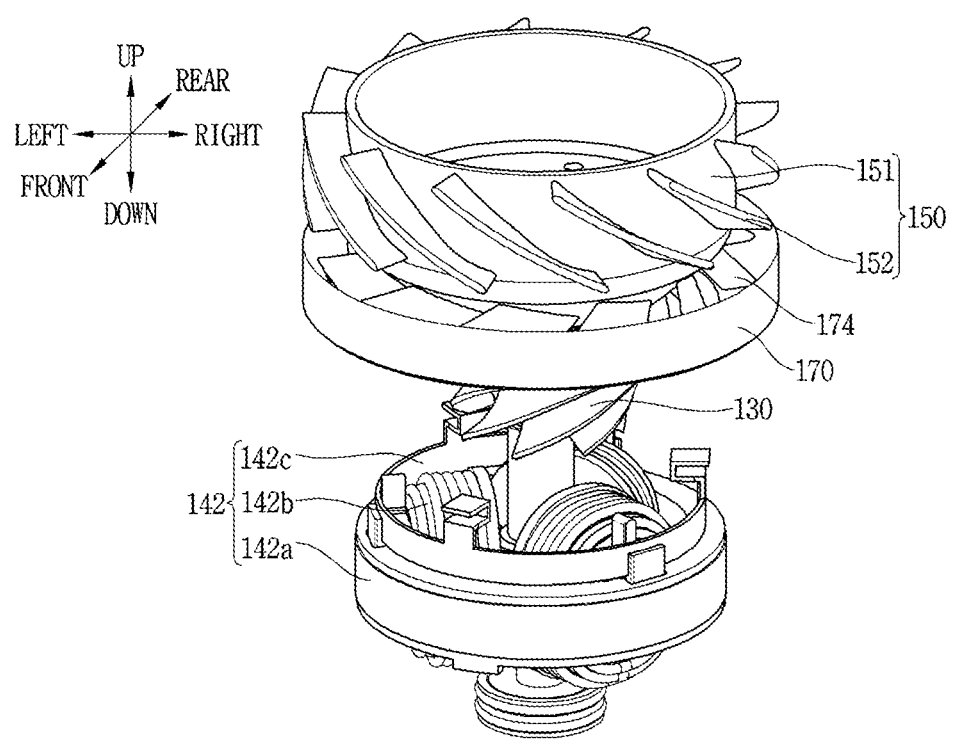
FIG. 4 is a conceptual view illustrating the fan motor of FIG. 3 from which a housing is removed.

FIG. 1 is a longitudinal sectional view of a fan motor 100, and FIG. 2 is an exploded perspective view of the fan motor 100. In addition, FIG. 3 is a conceptual view illustrating an exterior appearance of the fan motor, and FIG. 4 is a conceptual view illustrating the fan motor of FIG. 3 from which a housing is removed.

The fan motor 100 according to the present disclosure includes a housing 110, a rotation shaft 120, an impeller 130, a rotor 141 and a stator 142, a vane 150, a first bearing 161 and a second bearing 162, a first bearing housing 170 and a second bearing housing 180.

The housing 110 defines an exterior of the fan motor 100 and may have a circular cross section.

The housing 110 may have an accommodating space therein, and serves to form a flow of air in a lengthwise direction (up-down direction or axial direction on the drawing).

A speed of air sucked from a lower end portion of the housing 110 can be increased while passing through a bottle neck portion whose cross-sectional area is narrowed inside the housing 110.

The housing 110 may include an upper housing 111 and a lower housing 112, and air introduced from the upper housing 111 can be discharged through the lower housing 112.

The upper housing 111 may accommodate the rotor 141 and the stator 142, and the second bearing housing 180 therein.

The lower housing 112 is provided with a discharge port to discharge the air out of the lower housing 112. The vane 150 and the first bearing housing 170 are installed inside the lower housing 112. In addition, the impeller 130 may be installed at a boundary portion between the upper housing 111 and the lower housing 112.

The rotation shaft 120 may be rotatably provided in a direction crossing a center of the housing 110 in the axial direction.

The impeller 130 is configured to suck air from outside, and has a structure in which a plurality of blades 132 is provided on a hub 131 located at a central portion of the impeller 130.

The hub 131 of the impeller may be formed in a cylindrical shape, and may also be formed in a conical shape having a diameter increased from an upper end to a lower end of the hub 131.

The plurality of blades 132 may be formed to protrude spirally from an outer circumferential surface of the hub 131. The plurality of blades 132 may be spaced apart from each other in a circumferential direction of the hub 131. The plurality of blades 132 may have a gap getting wider from the upper end to the lower end of the hub 131.

The plurality of blades 132 and an inner side surface of the housing 110 are disposed to be spaced apart from each other with a predetermined gap to form a passage for air.

One end portion of the rotation shaft 120 may be provided with an impeller coupling portion 121. The impeller 130 may be coupled to the one end portion of the rotation shaft 120 to rotate together with the rotation shaft 120. As the impeller 130 rotates, air can be introduced from outside into the housing 110.

One end of the rotation shaft 120 may be provided with a first bearing mounting portion 123 to which the first bearing 161 is mounted. The first bearing 161 may be configured to rotatably support the first bearing mounting portion 123 of the rotation shaft 120.

A second bearing 162 may be coupled to a second bearing mounting portion 124. Here, the second bearing 162 may be implemented as a ball bearing. The second bearing 162 is configured to rotatably support the second bearing mounting portion 124 of the rotation shaft 120.

A permanent magnet 143 may be mounted between the first bearing mounting portion 123 and the second bearing mounting portion 124 to surround an outer circumferential surface of the rotor 141.

The first bearing mounting portion 123 and the second bearing mounting portion 124 may be disposed above and below the rotation shaft 120 with the permanent magnet 143 interposed therebetween.

The first bearing 161 serves to rotatably support one side of the rotation shaft 120 at one end portion of the rotation shaft 120.

In addition, the second bearing 162 is coupled to another end portion of the rotation shaft 120, which is an opposite side of the first bearing 161, with the rotor 141 interposed therebetween to rotatably support another side of the rotation shaft 120.

A first O-ring holder 161a may be mounted on an outer circumferential surface of the first bearing 161 to surround the outer circumferential surface of the first bearing 161. The first O-ring holder 161a may be formed in a cylindrical shape.

The first O-ring holder 161a may have a diameter same as or similar to an outer diameter of the first bearing 161. The first bearing 161 may be press-fitted to an inner circumferential surface of the first O-ring holder 161a.

In addition, by installing an O-ring to be accommodated in the first O-ring holder 161a, vibration transmission due to high-speed rotation can be prevented and an effect of self-alignment can be obtained.

The O-ring may be made of a material with elasticity. A plurality of O-rings may be disposed in the first O-ring holder 161a in the axial direction, and may serve to attenuate vibration and shock transmitted to the first bearing 161. In addition, by installing the plurality of O-rings inside the first O-ring holder 161a, a reliability as well as a damping effect can be secured.

The O-ring may be installed such that at least a portion of the O-ring protrudes from the first O-ring holder 161a. For example, the O-ring may be installed such that about 40% of a total volume of the O-ring protrudes from an outer side of the first O-ring holder 161a, and about 60% of the total volume of the O-ring is accommodated in the first O-ring holder 161a.

The second bearing 162 may be implemented as a ball bearing. The ball bearing may include an outer ring, an inner ring and a plurality of balls. The outer ring is fixedly installed on an inner circumferential surface of a second O-ring holder 162a, and the inner ring is coupled to an outer circumferential surface of the second bearing mounting portion 124. The plurality of balls is interposed between the outer ring and the inner ring to support a relative rotational motion of the inner ring with respect to the outer ring.

Each of the first O-ring holder 161a and the second O-ring holder 162a may be made of a polymer.

The first bearing housing 170 has a cylindrical shape and may accommodate to support the first bearing 161. The first bearing housing 170 may be disposed adjacent to the impeller 130 to be fixedly installed inside the housing 110.

In addition, although not specifically illustrated in the drawings of this specification, both of the first bearing 161 and the second bearing 162 may be implemented as either an O-ring or a ball bearing. In addition, the first bearing 161 may be implemented as a ball bearing, and the second bearing 162 may be implemented as an O-ring.

Figure 5A:
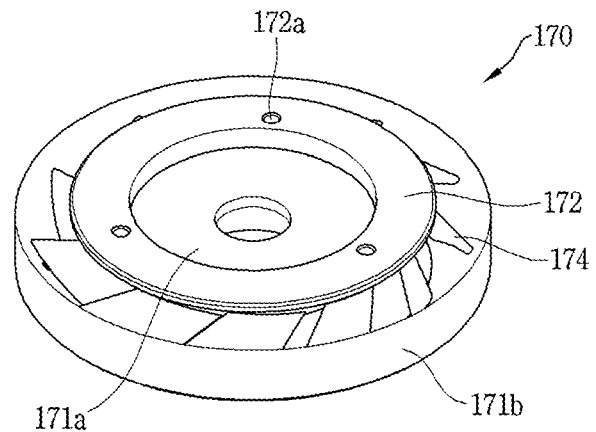
FIG. 5A is a perspective view illustrating a front portion of a bearing housing.
Figure 5B:
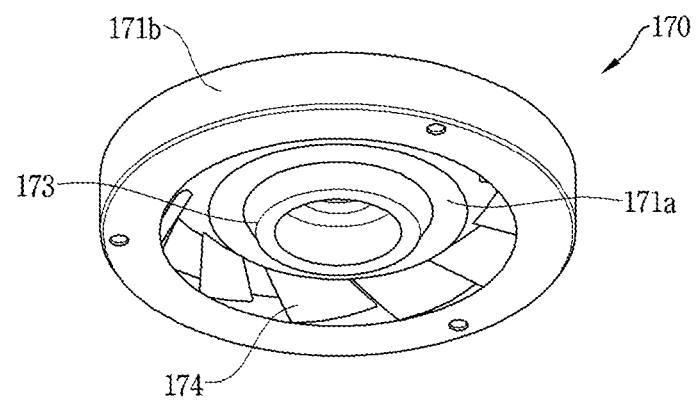
FIG. 5B is a perspective view illustrating a rear portion of the bearing housing.

As illustrated in FIGS. 5A and 5B, the first bearing housing 170 may include a cylindrical outer body 171b and an inner body 171a disposed inside the outer body 171b. The outer body 171b and the inner body 171a are disposed to be spaced apart from each other with a predetermined gap, and a plurality of plates 174 connecting the outer body 171b and the inner body 171a may be provided between the outer body 171b and the inner body 171a.

Air can flow through the gap and the plates 174 formed between the inner body 171a and the outer body 171b.

Here, the inner body 171a and the outer body 171b facing each other have a predetermined inclination, and air can flow more smoothly along an inclined surface.

The first bearing housing 170 may include the cylindrical outer body 171b and the inner body 171a disposed inside the outer body 171b. The outer body 171b and the inner body 171a are disposed to be spaced apart from each other with a predetermined gap, and the plurality of plates 174 connecting the outer body 171b and the inner body 171a may be provided between the outer body 171b and the inner body 171a.

The bearing can be stably supported by the outer body 171b and the inner body 171a constituting the first bearing housing 170.

Specifically, as the inner body 171a is provided with a bearing supporting portion 173 protruding downwardly and the first bearing 161 is seated on the bearing supporting portion 173, a stable support structure can be implemented. Here, since the inner body 171a is coupled to the outer body 171b by the plurality of plates 174 and the vane 150 is coupled to an upper portion of the outer body 171b by screw fastening, the first bearing 161 can be more stably supported, and thus, the rotary shaft 120 can rotate at high speed.

In a case of the related art disclosure, since a bearing housing was separately installed and it was difficult to guide a flow of air, there was a high possibility of air flow loss.

However, in this embodiment, the plurality of plates 174 is installed in the first bearing housing 170 to reduce air flow loss. Specifically, the plurality of plates 174 protrudes along an inner side surface of the lower housing 112, thereby enabling the vane to serve its existing role of guiding a movement of air. With such a structure of the plate 174, reducing an axial length of the impeller 170 may be considered, and therefore, a more compact fan motor structure can be implemented.

That is, in the disclosure according to this embodiment, the first bearing housing 170 is capable of performing a role as a bearing housing capable of implementing a bearing support structure by the inner body 171a and the outer body 171b, as well as guiding a flow of air with the plurality of plates 174 to reduce a loss of air flow compared with a case where a bearing housing supporting the bearing is separately installed.

The stator 142 is disposed at an upper portion of the second bearing housing 180 and may be mounted to be accommodated inside the upper housing 111.

The stator 142 includes a stator core 142a and a stator coil 142b.

The stator core 142a may include a back yoke 142e and a plurality of teeth 142d.

The back yoke 142e may be formed in a ring shape. Each of the plurality of teeth 142d is formed to protrude from an inner side surface of the back yoke 142e toward a center of the back yoke 142e.

The plurality of teeth 142d may be formed to be detachable from the back yoke 142e. In this embodiment, the plurality of teeth 142d may be provided in three.

A coupling protrusion may be formed to protrude at one end portion of each of the plurality of teeth 142d.

The coupling protrusion may be slidably coupled along a coupling groove formed on an inner side of the back yoke 142e in the axial direction.

A pole shoe may be formed to protrude in a circumferential direction at another end portion of each of the plurality of teeth 142d. The plurality of teeth 142d is disposed to be spaced apart from each other in a circumferential direction of the back yoke 142e.

The stator coil 142b may be provided in plurality to be configured as a three-phase coil. Each phase of the plurality of stator coils 142b may be wound on the teeth 142d in a form of a concentrated winding.

This configuration not only improves an output of the motor, but also contributes to miniaturization and weight reduction of the motor.

An insulator 142c insulating between the stator core 142a and the stator coils 142b may be interposed between the stator core 142a and the stator coils 142b. The insulator 142c may be formed to surround a part of the teeth 142d or a part of the back yoke 142e. The insulator 142c is made of an insulating material such as plastic.

The rotor 141 may include the permanent magnet 143.

The permanent magnet 143 may be provided on an outer circumferential surface of a rotor supporting portion 122. The permanent magnet 143 may have a diameter smaller than an inner diameter of the stator core 142a and may be located inside the stator core 142a.

Here, the inner diameter of the stator core 142a refers to a diameter of a circumference that passes inner ends of a plurality of pole shoes in a circumferential direction.

The permanent magnet 143 may be rotatably mounted on the rotation shaft 120 with an air gap radially inward with the pole shoes of the stator core 142a.

In order to limit an axial movement of the permanent magnet 143, an end cap may be installed at a lower side of the rotor supporting portion 122. The end cap (not illustrated) may be formed in a cylindrical shape to have a diameter same as that of the permanent magnet 143.

One side of the permanent magnet 143 is brought into contact with a portion having a diameter larger than that of the rotor supporting portion 122, so that an upward movement of the permanent magnet 143 in the axial direction is restricted. In addition, as described above, a downward movement of another side of the permanent magnet 143 in the axial direction can be limited by the end cap (not illustrated).

For example, as illustrated in FIG. 2, the impeller coupling portion 121 may be provided at an upper portion of the rotation shaft 120 and the rotor supporting portion 122 may be provided at a lower portion of the rotation shaft 120, with respect to a central portion of the rotation shaft 120. Here, the central portion of the rotation shaft 120 may have a diameter larger than that of the impeller coupling portion 121 and that of the rotor supporting portion 122 to form steps. That is, the permanent magnet 143 of the rotor supporting portion 122 is installed to be fitted to an outer side of the rotor supporting portion 122, and an upward movement of the rotation shaft 120 in the axial direction is limited by the step formed on the rotation shaft 120.

When three-phase alternating current is applied to each of the plurality of stator coils 142b, the permanent magnet 143 may form a rotational force by an electromagnetic interaction with a magnetic field generated around the stator coils 142b.

With this configuration, the rotation shaft 120 may rotate due to an electromagnetic interaction between the rotor 141 and the stator 142.

The vane 150 is disposed at a downstream side of the first bearing housing 170 and serves to guide a flow of air moving from the first bearing housing 170.

The vane 150 may be provided with a plurality of vane blades 152 along an outer side surface of a cylindrical vane hub 151.

The vane hub 151 is disposed to be brought into contact with a vane mounting portion 172 to be fixed thereto by a screw fastening through vane fixing holes 172a.

The plurality of vane blades 152 may be formed to protrude in a spiral direction, and may be disposed to be spaced apart from each other in a circumferential direction of the vane hub 151.

The vane blades 152 may have a shape corresponding to the plurality of plates 174 formed in the first bearing housing 170.

For example, an extending direction of an end portion of the vane blade 152 and an extending direction of an end portion of the plate 174 formed in the first bearing housing 170 may be the same. In addition, each of the vane blades 152 is formed obliquely in an up-down direction on an outer circumferential surface of the vane hub 151, and the plurality of plates 174 formed on the first bearing housing 170 may be obliquely arranged in the up-down direction. Here, since a distance between a lower end portion of each of the vane blades 152 and an upper end portion of each of the plates 174 is minimized, air moving along the vane blades 152 will be able to move more smoothly toward each of the vane blades 152.

The vane hub 151 and the vane blades 152 may be integrally formed and made of an insulating plastic material.

The second bearing housing 180 is disposed under the stator 142.

A second bearing accommodating portion 180b may be formed in an inner central portion of the second bearing housing 180 to accommodate the second bearing 162. The second bearing accommodating portion 180b may be recessed at a central portion of the second bearing housing 180, and the second bearing may be accommodated in the second bearing accommodating portion 180b. Here, the second bearing 162 may be implemented as a ball bearing.

A second axial movement limiting portion 173 at an upper end of the second bearing accommodating portion 180b may extend radially inward.

A plurality of air inlet holes 180a is formed around the second bearing accommodating portion 180b of the second bearing housing 180 to allow air to be introduced from outside. Each of the air inlet holes 180a is formed through the second bearing housing 180 to allow air to be introduced from outside.

An outer ring portion 180d having a predetermined height may be formed at an outer edge of the second bearing housing 180, and the height of the outer ring portion 180d may be relatively smaller than a diameter of the outer ring portion 180d.

Between an inner side surface of the outer ring portion 180d of the second bearing housing 180 and the second bearing accommodating portion 180b, a connection portion 180c may be formed to extend in a radial direction. For example, a plurality of connection portions 180c is disposed to be spaced apart from each other at equal intervals in a circumferential direction of the outer ring portion 180d to have a shape of three feet, so that three air inlet holes 180a are formed between the outer ring portion 180d and the connection portions 180c.

Figure 6A:
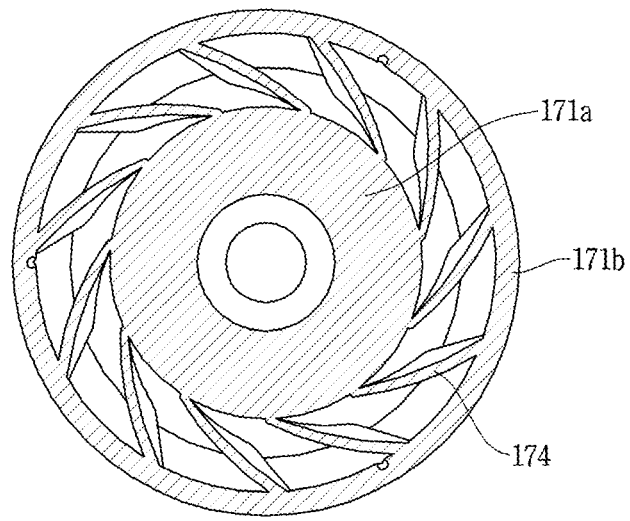
FIG. 6A is a sectional view of the bearing housing cut in a transverse direction.
Figure 6B:
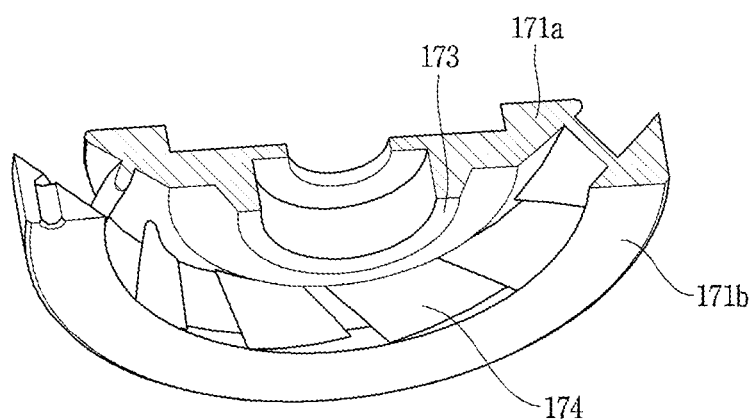
FIG. 6B is a sectional view of the bearing housing cut in a longitudinal direction.

FIG. 5A is a perspective view illustrating a front portion of a bearing housing, and FIG. 5B is a perspective view illustrating a rear portion of the bearing housing. In addition, FIG. 6A is a sectional view of the bearing housing cut in a transverse direction, and FIG. 6B is a sectional view of the bearing housing cut in a longitudinal direction.

Figure 7:
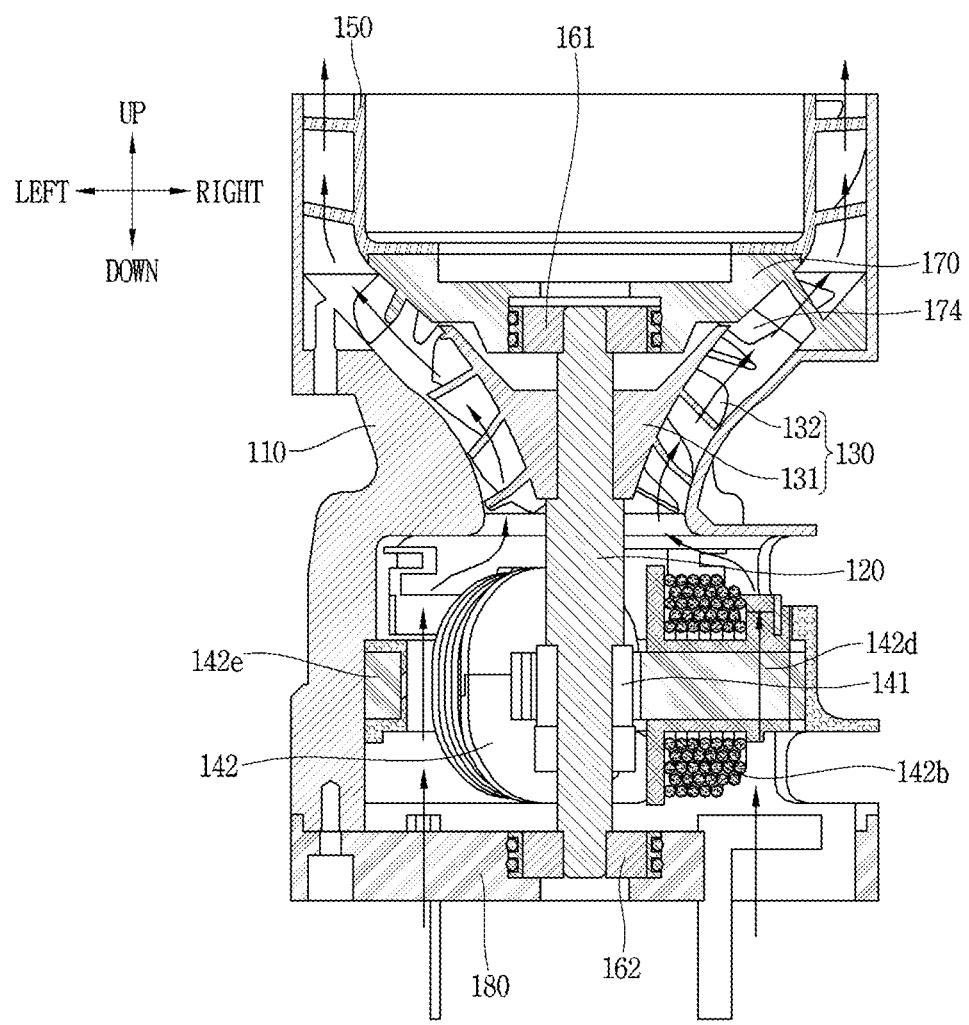
FIG. 7 is a conceptual view illustrating a flow path of air in the fan motor.

In addition, FIG. 7 is a conceptual view illustrating a flow path of air in the fan motor.

The first bearing housing 170 formed in a cylindrical shape is disposed adjacent to the impeller 130 to be fixedly installed inside the housing 110, and serves to accommodate and support the first bearing 161.

The first bearing housing 170 may include the cylindrical outer body 171b, the inner body 171a disposed inside the outer body 171b, and the plates 174 connecting between the outer body 171b and the inner body 171a.

The first bearing housing 170 may be disposed at a downstream side of the impeller 130 with respect to a flow direction of air generated by the impeller 130. Here, the downstream side refers to a rear side with respect to a flow of air.

Air introduced from a lower portion of the housing 110 passes through the stator 142 and the rotor 141 by an operation of the impeller 130 to move toward the first bearing housing 170.

The first bearing housing 170 may include the inner body 171a formed in a cylindrical shape and a plurality of plates 174 formed along an outer circumferential surface of the inner body 171a.

In addition, the outer body 171b is provided at an outer side of the inner body 171a, and the plurality of plates 174 is provided between the inner body 171a and the outer body 171b to connect between the inner body 171a and the outer body 171b.

The inner body 171a is disposed inside the first bearing housing 170 formed in a cylindrical shape, and has a structure in which the vane 150 is disposed above the inner body 171a and the impeller 130 is disposed under the inner body 171a.

Specifically, the vane mounting portion 172 is provided at an upper surface of the inner body 171a to support a bottom surface of the vane 150 with being brought into contact with the bottom surface of the vane 150. The vane mounting portion 172 may have a predetermined area in a radial direction, and may be disposed to partially overlap with the plates 174 disposed between the inner body 171a and the outer body 171b.

The bottom surface of the vane 150 may be fixed to the inner body 171a by a screw fastening through the vane fixing holes 172a formed in the inner body 171a.

In addition, a lower surface of the inner body 171a may be provided with the bearing supporting portion 173 protruding downwardly so that the first bearing 161 is mounted thereon.

The bearing supporting portion 173 may protrude from a central portion of a bottom surface of the first bearing housing 170. The bearing supporting portion 173 may be open toward the impeller 130 and may be penetrated in the axial direction.

The bearing supporting portion 173 is formed in a circular ring shape to protrude downwardly, and the first bearing 161 is disposed in an accommodating space provided inside the bearing supporting portion 173 to allow a rotation of the rotation shaft 120a.

Specifically, the bearing supporting portion 173 may be formed in a cylindrical shape, and the first bearing 161 may be accommodated in the bearing supporting portion 173. By the bearing supporting portion 173, a movement in an axial direction and a radial direction of the first bearing 161 can be restricted. The first bearing 161 is restricted from moving in the axial direction toward the rotor 141 in a state being accommodated in the bearing supporting portion 173.

In addition, the impeller 130 may be disposed to overlap the first bearing housing 170 in the axial direction to cover the bearing supporting portion 173.

In addition, the first bearing housing 170 may include the plurality of plates 174 extending from an outer side surface of the inner body 171a toward the outer body 171b.

The plurality of plates 174 each is formed in a shape of a thin plate to allow air sucked by the impeller 130 to move toward the impeller 130. The plurality of plates 174 may be radially disposed along the outer side surface of the inner body 171a.

In addition, each plate 174 may be formed obliquely by a predetermined angle along the outer side surface of the inner body 171a. With the plurality of plates 174, a flow resistance of air can be minimized, and air can be more smoothly delivered toward the vane 150.

The vane 150 is disposed at the downstream side of the first bearing housing 170 and serves to guide a flow of air moving from the first bearing housing 170.

In addition, according to this embodiment, the first bearing housing 170 is capable of performing a role as a bearing housing capable of implementing a bearing support structure by the inner body 171a and the outer body 171b, as well as guiding a flow of air with the plurality of plates 174 to reduce a loss of air flow compared with a case where a bearing housing supporting the bearing is separately installed.

When the impeller 130 rotates due to a rotation of the rotation shaft 120, air is introduced through the air inlet holes 180a formed at the second bearing housing 180. The air introduced moves toward the vane 150 along an inner side of the housing 110.

Specifically, as air is introduced into the second bearing housing 180, the air can cool the second bearing 162 disposed adjacent to the second bearing housing 180. In addition, air at a low temperature introduced from the second bearing housing 180 can directly cool off a heat generated by operations of the stator 142 and the rotor 141.

Accordingly, a cooling efficiency can be improved compared with the related art case where the stator 142 and the rotor 141 are cooled by air that has already moved through the impeller 130.

In this embodiment, air introduced from outside can cool the rotor 141 and the stator 142 first. That is, in a structure of the present disclosure, as air from outside preferentially cools the rotor 141 and the stator 142 before a temperature of the air rises, a cooling efficiency can be improved compared with the related art case where air passed through the impeller 130 located at an upper portion cools the rotor and the stator.

Air introduced into an interior of the housing 110 may pass through the stator 142 and the rotor 141 to pass through a space between the plurality of blades 132 of the impeller 130 and the inner side surface of the housing 110, and then move toward an upper portion along the plurality of plates 174 formed between the inner body 171a and the outer body 171b of the first bearing housing 170. Air moving toward the upper portion can be discharged outside through a space between the vane 150 and the housing 110.

That is, as illustrated in FIG. 7, a moving path of air is formed by the operation of the impeller 130 as illustrated by arrows.

Here, in the present disclosure, since the air moved by the blades 132 of the impeller 130 forms its movement without changing its movement path due to the plurality of plates 174 formed in the first bearing housing 170 thereby minimizing an interference of air flow by the flow path, a reduction in a fan efficiency is prevented.

As described above, the present disclosure has a structure that the rotation shaft 120 can be supported by the first bearing 161 and the second bearing 162 supporting each end of the rotation shaft 120 even when the rotation shaft 120 rotates at high speed of 100,000 rpm or above. Specifically, since the first bearing 161 and second bearing 162 are stably supported by the first bearing housing 170 and the second bearing housing 180, respectively, to limit an application of impact to the bearing and a shortening of its lifespan, the lifespan of the high-speed rotating fan motor can be extended.

For example, since the first bearing 161 is supported by the first bearing housing 170 and the second bearing 162 is supported by the second bearing housing 180, more stable support can be achieved during a high-speed rotation of the motor even when the first bearing 161 and the second bearing 162 supporting each end of the rotation shaft 120 are arranged far from each other according to a motor design.

In addition, as a distance from the rotor 141 to the first bearing 161 and a distance from the rotor 141 to the second bearing 162 are different from each other and the impeller 130 is disposed adjacent to the first bearing 161 so as to more stably absorb a shock that might be occurred due to the operation of the impeller 130, a posture thereof can be stably maintained in the high-speed rotation of the motor.

In the related art, since air introduced by the rotation of the impeller flows into the motor while being brought into contact with the impeller, which is disadvantageous to cooling of the motor and makes it difficult to secure a performance of the motor during high-speed rotation, it has been tried to secure a cooling performance of the motor with a structure in which a bearing is installed between an impeller and the motor.

In such a related art disclosure, the bearing is disposed between the impeller and the motor, and specifically, the bearing is disposed at one side of the impeller, so that the impeller has a structure in which one bearing supports the impeller in a form of a cantilever. This may result in a stability problem in high-speed rotation of the impeller.

To solve the problem, installing of bearings to support the rotation of the rotation shaft at both ends of the rotation shaft may be considered, but this may widen a distance between each end of the bearing to deteriorate a stability during a high-speed rotation.

On the other hand, since the first bearing 161, the impeller 130, the rotor 141 and the stator 142, and the second bearing 162 are sequentially installed on the rotation shaft, in particular, the impeller 130, the rotor 141 and the stator 142 are installed between the first bearing 161 and the second bearing 161 in the disclosure according to this embodiment, both ends of the rotation shaft 120 can be more effectively supported to implement a more stable structure in the fan motor 100 rotating at high speed.

That is, in the disclosure according to this embodiment, a cooling performance of the motor can be secured with a structure in which the first bearing 161 is supported by the first bearing housing 170 and the second bearing 162 is supported by the second bearing housing 172. In addition, more stable support will be possible when the motor rotates at high speed even when the first bearing 161 and the second bearing 162 are arranged far from each other according to a motor design.

In addition, as the first O-ring holder 161*a* is mounted on the outer circumferential surface of the first bearing 161 to surround the outer circumferential surface of the first bearing 161 and an O-ring is accommodated in the first O-ring holder 161*a*, vibration transmission due to high-speed rotation can be prevented and an effect of self-alignment can be obtained.

In addition, a plurality of O-rings is disposed in the first O-ring holder 161*a* in the axial direction to absorb vibration and shock transmitted to the first bearing 161.

Here, the second bearing 162 may be configured as a ball bearing including an outer ring, an inner ring, and a plurality of balls, and may also be configured in a structure in which an O-ring is installed inside the O-ring holder, like the first bearing 161.

In addition, in the present disclosure, since air introduced by high-speed rotation of the impeller 130 is brought into contact with the stator 142 and the rotor 141 to cool off the heat generated from the stator 142 and the rotor 141 due to an operation of the motor, the heat generated by high-speed rotation can be more effectively removed.

That is, unlike the related art, the present disclosure is capable of not only improving a cooling efficiency of the motor by changing the movement path of air to allow air introduced from outside to be brought into contact with the stator 142 and the rotor 141 first, but also forming a flow of air that minimizes a flow resistance of air in the bearing support structure implemented by the plurality of plates 174 and the plurality of plates 174 provided in the bearing housing 170.

The foregoing embodiments are merely given of those embodiments for practicing a fan motor according to the present disclosure. Therefore, the present disclosure is not limited to the above-described embodiments, and it will be understood by those of ordinary skill in the art that various changes in form and details may be made therein without departing from the scope of the present disclosure.

What is claimed is:

1. A fan motor, comprising:
    a housing;
    a rotation shaft oriented across an inner center of the housing;
    an impeller located at a first side of the rotation shaft;
    a rotor connected to the rotation shaft and spaced apart from the impeller in an axial direction;
    a stator that surrounds the rotor;
    a first bearing that is configured to rotatably support a portion of the rotation shaft;
    a second bearing that is disposed at an opposite side of the rotation shaft from the first bearing and that is configured to rotatably support the rotation shaft; and
    a first bearing housing that accommodates and supports the first bearing, that is fixed inside the housing, and that is configured to guide a flow of air introduced into the housing,
    wherein the first bearing housing comprises:
        an outer body having a cylindrical shape,
        an inner body having a cylindrical shape and disposed inside the outer body, and
        a plurality of plates that connect an outer surface of the inner body to an inner surface of the outer body, and
    wherein the outer surface of the inner body and the inner surface of the outer body facing each other are inclined to guide the air to flow along the inclined surfaces of the inner body and the outer body, and
    wherein the outer surface of the inner body and the inner surface of the outer body are each inclined at an oblique angle with respect to the axial direction of the rotation shaft.

2. The fan motor of claim 1, wherein air introduced by an operation of the impeller moves to the first bearing housing while being brought into contact with the stator and the rotor.

3. The fan motor of claim 1, wherein each plate of the plurality of plates is configured to guide, to outside of the housing, the flow of air passing through the impeller.

4. The fan motor of claim 1, wherein the plurality of plates is radially and obliquely oriented by a predetermined angle such that the air introduced into the housing moves toward the impeller.

5. The fan motor of claim 1, wherein the plurality of plates is disposed at predetermined intervals along the outer surface of the inner body.

6. The fan motor of claim 1, wherein an upper surface of the inner body includes a vane mounting portion that has a flat shape with a predetermined area.

7. The fan motor of claim 6, wherein a lower surface of the inner body includes a bearing supporting portion that protrudes downward and mounts the first bearing.

8. The fan motor of claim 7, wherein the bearing supporting portion has a circular ring shape that protrudes downwardly and defines an accommodating space in which the first bearing is disposed.

9. The fan motor of claim 1, further comprising:
    a second bearing housing that is coupled to a lower portion of the housing, that is disposed at an upstream side of the stator with respect to a flow direction of the air, and that includes a bearing accommodating portion that is recessed at a central portion thereof to accommodate the second bearing.

10. The fan motor of claim 9, wherein the second bearing housing defines a plurality of air inlet holes at positions adjacent to the bearing accommodating portion to allow intake of air.

11. The fan motor of claim 10, wherein the second bearing housing comprises:
    an outer ring portion having a cylindrical shape with a predetermined height at an outer edge of the second bearing housing; and
    a connection portion extending to connect the bearing accommodating portion to the outer ring portion.

12. The fan motor of claim 11, wherein each hole of the plurality of air inlet holes is provided through the connection portion and is provided between the outer ring portion and the connection portion.

13. The fan motor of claim 9, wherein the air introduced into the housing passes through the second bearing housing, through the rotor and the stator, and through the impeller and the first bearing housing to be discharged outside of the housing.

14. The fan motor of claim 1, further comprising:
a vane disposed on the first bearing housing in a vertical direction to guide a flow of air moving from the first bearing housing.

15. The fan motor of claim 14, wherein the vane includes a plurality of vane blades along an outer surface of a cylindrical vane hub, and
wherein each blade of the plurality of vane blades is disposed in a shape corresponding to a shape of a plurality of plates provided in the first bearing housing.

16. The fan motor of claim 1, wherein the impeller includes a plurality of blades protruding along an outer circumferential surface of a cylindrical hub.

17. The fan motor of claim 1, wherein the first bearing is implemented as an O-ring, and the second bearing is implemented as a ball bearing.

18. The fan motor of claim 1, wherein the impeller, the rotor, and the stator are disposed between the first bearing and the second bearing, the first bearing and the second bearing installed at each end of the rotation shaft.

19. The fan motor of claim 1, wherein the first bearing housing is installed at a downstream side of the impeller with respect to the flow of air generated by the impeller.

20. A fan motor, comprising:
a housing;
a rotation shaft oriented across an inner center of the housing;
an impeller located at a first side of the rotation shaft;
a rotor connected to the rotation shaft and spaced apart from the impeller in an axial direction;
a stator that surrounds the rotor;
a first bearing that is configured to rotatably support a portion of the rotation shaft;
a second bearing that is disposed at an opposite side of the rotation shaft from the first bearing and that is configured to rotatably support the rotation shaft;
a first bearing housing that accommodates and supports the first bearing, that is fixed inside the housing, and that is configured to guide a flow of air introduced into the housing; and
a vane disposed on the first bearing housing in a vertical direction to guide a flow of air moving from the first bearing housing,
wherein the vane includes a plurality of vane blades along an outer surface of a cylindrical vane hub, and
wherein each blade of the plurality of vane blades is disposed in a shape corresponding to a shape of a plurality of plates provided in the first bearing housing.

21. The fan motor of claim 20, wherein the impeller, the rotor, and the stator are disposed between the first bearing and the second bearing, the first bearing and the second bearing installed at each end of the rotation shaft.

* * * * *